United States Patent Office 3,401,589
Patented Sept. 17, 1968

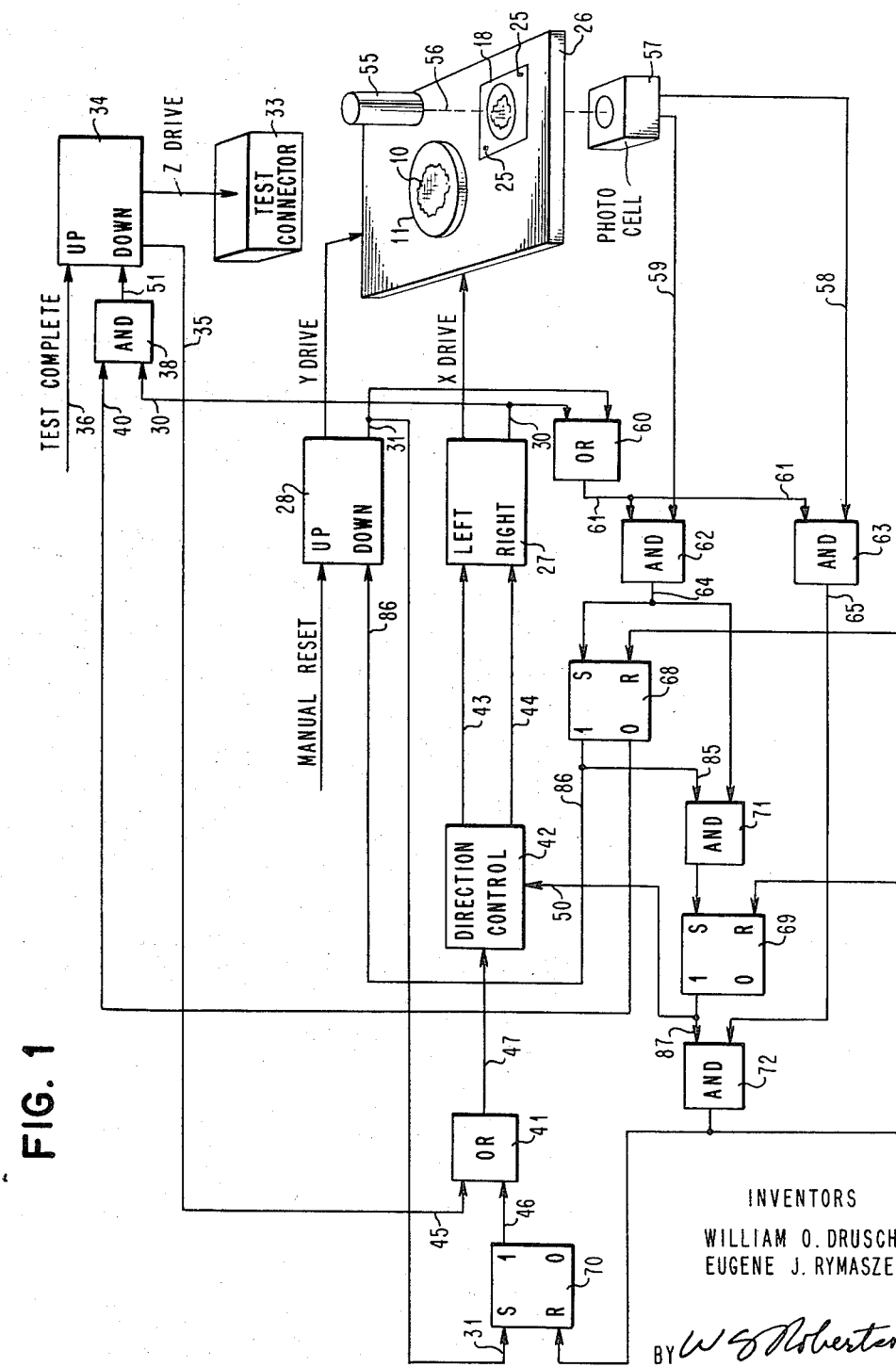

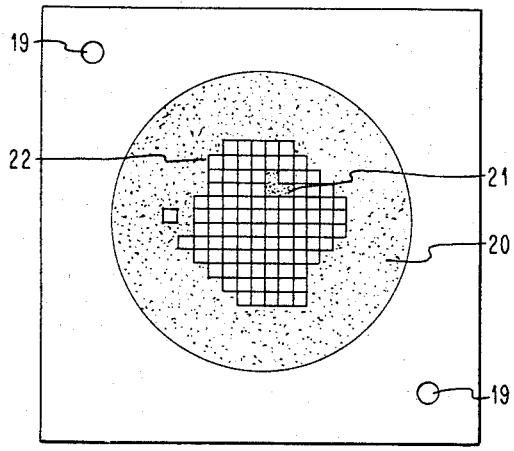
FIG. 3
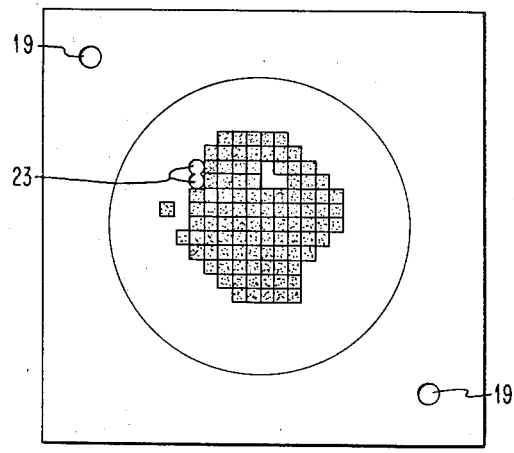
FIG. 4
FIG. 2
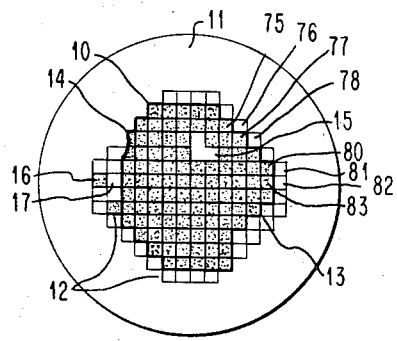

3,401,589
METHOD OF CONTROLLING A TESTING APPARATUS THROUGH THE USE OF A PHOTOGRAPH OF THE OBJECT BEING TESTED
William O. Druschel, Granite Springs, and Eugene J. Rymaszewski, Poughkeepsie, N.Y., assignors to International Business Machines Corporation, New York, N.Y., a corporation of New York
Filed Dec. 23, 1964, Ser. No. 420,626
9 Claims. (Cl. 88—14)

This invention relates generally to a method and to an optical apparatus for controlling a mechanism to operate through a geometric pattern presented by a subject. More specifically, this invention relates to an apparatus and method for generating a pattern for the subject and controlling the mechanism to follow the pattern.

The invention will be described as it is used in testing transistors. In one method of manufacturing transistors a thin wafer of semiconductor material about an inch in diameter is formed on a support and then cut in a grid pattern to form many individual semiconductor chips about .030 inch square. Each chip has outwardly facing terminals, and while the chips are still held in their wafer shape a test probe is electrically connected to each chip in turn for electrical tests. In prior art testing, the wafer support has been mounted on a carriage that is driven past the test probe step by step through each point when a chip might be formed. Because the wafers are irregularly shaped, this prior art method has required scanning and testing at points where a chip may be missing or only partly formed and where the wafer may not fill the ideal outline. A general object of this invention is to provide a new and improved apparatus and method in which an irregularly shaped subject is tested in an optimum pattern. A more specific object of this invention is to provide a method and apparatus for distinguishing between chips and holes in the array of the wafer and for controlling the test apparatus to skip the holes and scan and test only the chips.

The chips and holes can be readily distinguished visually; the wafers are formed on transparent supports and the holes are transparent and the chips are opaque and highly reflective. However, it is very difficult to distinguish between a chip and a hole at a particular point on the wafer because the individual chips are very small in relation to the apparatus holding the chips and operating to test the chips.

In the method of this invention, each wafer is photographed to form a record of the chips and holes at each point, and the test apparatus is controlled to follow the pattern in the photograph in testing the corresponding wafer. The means for controlling the apparatus to follow the photograph comprises a fixture to hold the photograph to move with the corresponding wafer during the test and and optical device such as a light source and photocell positioned to read the state of the point on the photograph that corresponds to the chip or hole in the test position. The carriage and the test apparatus are controlled to scan and test only the full chips and not the holes or partial chips. In the specific embodiment that will be discussed, the apparatus is controlled to stop at the end of a row of chips and shift to the next row without scanning either row entirely if the wafer is incomplete.

As one embodiment of the invention is described in detail, other objects, advantages and features of the invention will be explained.

FIG. 1 is a schematic of a semiconductor wafer, relevant parts of a test device, and the controlling apparatus of this invention.

FIG. 2 is a top view of a wafer on its support.

FIG. 3 shows a negative photograph of the wafer of FIG. 2.

FIG. 4 shows a positive photograph of the wafer of FIG. 2.

FIG. 1 and FIG. 2 show the subject that the apparatus and method of this invention are intended to test, a semiconductor wafer 10 that has been formed on a transparent support 11 cut into a grid pattern shown by lines 12 in FIG. 2. (Within wafer 10 lines 12 represent transparent spacings where the semiconductor material is cut away to form the individual chips.) Ordinarily the wafer does not fill the ideal pattern outlined by grid 12; FIG. 2 illustrates a region 13 of holes between the edge of the ideal grid pattern 12 and the edge of the wafer, and points 14 where the outermost chips only partially fill a square in the grid. FIG. 2 also shows holes 15 within the wafer where chips are missing or are otherwise recognizable without test as being defective, and a chip 16 that is isolated from others by a hole 17. Support 11 and the outline of grid 12 are illustrated about one and one half times the usual size; the squares within the grid are many times the actual size of the chips.

In one of the steps of this method of testing transistors, the wafer of FIG. 2 is photographed to produce either a negative shown in FIG. 3 or a positive shown in FIG. 4. FIG. 1 illustrates the photograph 18 arbitrarily as the negative as in FIG. 3. Preferably the photograph of FIGS. 3 and 4 are formed by contact photography so that they are substantially identical in size to the actual wafer of FIG. 2; a film is placed directly against a wafer and is illuminated from the opposite side of support 11. Holes 19 are formed in the films of FIGS. 3 and 4 for positioning a film on the test apparatus of FIG. 1.

In the negative film of FIG. 3 the speckled area 20 outside the water and the speckled area 21 which corresponds to holes 15 are opaque (the grid lines 12 outside the wafer do not appear in either photograph). The photograph of FIG. 3 also has an opaque area 22 (indistinct from area 20) where the image of the partially formed chips 14 of FIG. 2 has been blacked out so that it will appear as holes and the partial chips 14 will not be tested. FIG. 4 is similar to the support and wafer assembly of FIG. 2 except for a region 23 where the dark regions corresponding to the partial chips 14 of FIG. 2 have been eliminated; for example, they may be punched out by means of a hand held punch; as in FIG. 2, the grid lines represent transparent spacing between chips.

The apparatus of FIG. 1 will be described in two parts, first only the components that operate to advance the wafer through the test sequence in a region of no holes (as in the prior art) and secondly the components that control the apparatus to follow the pattern provided by photograph 18. As FIG. 1 shows, photograph 18 is positioned on a carriage 26 by means of pins 25 that engage holes 19; the assembly of wafer 10 and support 11 is also mounted on carriage 26, preferably by means of a vacuum chuck. Support 11 is aligned to give wafer 10 the same orientation on carriage 26 as photograph 18. Carriage 26 is conventional and can be driven in the direction of the rows of chips by an X direction drive mechanism 27, and can be driven in the direction of the columns by means of a Y direction drive mechanism 28. Such drive mechanisms are conventional and their details are relevant in this description only to the extent that a control device described later is adapted to respond to position indicating signals provided by each mechanism and to produce appropriate controlling signals. Each mechanism 27, 28 comprises a reversible motor for moving carriage 26 in the selected direction; means, such as a cam operated switch arranged to close shortly after the motor starts and to open when the motor reaches the next position is provided for X drive mechanism 27 so that the motor is advanced one step in response to a short duration input or is run continuously in response to a continuous input. Y drive mechanism has a mechanism for its up direction similar to the control of the X drive mechanism so that a steady manual input returns the carriage to a starting position; the down direction control may be of a similar type arranged to lower the carriage only one step in response to a signal that may be longer than the time for one step. Mechanisms 27, 28 have means such as similar motor operated cam switches that produce signals at lines 30 and 31 when the mechanism enters a new position. As will be explained later in detail, the X and Y drive mechanisms are operated to step carriage 26 from one point to the next along a row and then to shift down to the next row and begin stepping from point to point in the other direction.

A suitable test connector 33 is mechanically positioned by a Z direction drive mechanism 34 to a down position to engage the terminals of a properly positioned chip for the electrical test; it is positioned in an up position at the end of a test so that carriage 26 can be shifted to the next position. Z drive mechanism 34 may be generally similar to mechanisms 27, 28 and is arranged to produce a signal on a line 35 when it reaches its up position.

A suitable device for conducting the desired sequence of electrical tests is electrically connected by test connector 33 to the terminals of a chip when Z drive mechanism 34 is in its down position. The test device is arranged to energize a line 36 at the end of a test to signal Z drive device 34 to move to its up position.

When the apparatus is operating in a region of continuous chips (or a minimum number of nearby holes as will be explained later), a suitable logic circuit operates X drive mechanism 27 and Z drive mechanism 34 alternately to advance the carriage 26 along a row and lower the test connector to engage the chip terminals. An AND gate 38 is connected to energize the down input of Z drive mechanism 34 momentarily in response to a signal on a branch of line 30 indicating that X drive mechanism 27 has reached the position for the next test. (Input 40 of AND gate 38 is kept energized except when the apparatus is operating on wafer 10 in a region of holes.) At the end of a test, Z drive mechanism is controlled by a signal on line 36 to return to its up position so that carriage 26 can be moved to the next position in the row. An OR gate 41 and a direction control 42 cooperate to energize a previously selected input 43 or 44 of X drive mechanism 27 to shift carriage 26 when a short duration input to OR gate 41 on a line 45 signifies that Z drive mechanism has returned to its up position. (Input 46 of OR gate is energized only when the apparatus is operating in a region of holes.)

Direction control 42 is made to switch the output 47 of OR gate 41 from one to the other of inputs 43, 44 of X drive mechanism 27 in response to a signal on an input line 50 that is produced only when the apparatus is operating in a region of holes in the wafer. Direction control 42 may comprise a bistable circuit that switches from one to the other of two outputs in response to a pulse on line 50 and two AND gates each responsive to the signal on line 47 and to one of the two outputs of the bistable circuit to couple line 47 to the selected line 43, 44.

A light source 55 is positioned on one side of photograph 18 to direct a light beam 56 to a point on the photograph that corresponds to the point of wafer 10 that is in the position for test. A light sensitive device 57 is positioned on the other side of the photograph to respond to light transmitted through transparent points on the photograph; device 57 is arranged to produce suitable signals indicating whether the test point contains a hole or a chip and to produce separate pulses for individual adjacent chips or adjacent holes. As FIG. 1 illustrates the invention, light sensitive device 57 is arranged to produce a signal on a line 58 indicating a chip and on a line 59 indicating a hole; an OR circuit 60 is connected to receive signals on branches of lines 30, 31 and to produce an output on a line 61 when the carriage is moved into a new position; AND gates 62, 63 combine signals 58, 59 and 61 to energize a line 64 when a hole is encountered and a line 65 when a chip is encountered. Lines 64, 65 can be thought of as the outputs of light sensitive device 57 since the intervening components function only to break up the output of device 57 into individual pulses for each point in the wafer.

A circuit of memory devices 68, 69, 70 and interconnecting logic gates 71, 72 are arranged to respond to a sequence of holes and chips to operate carriage 26 to shift rows, find the farthest chip in the next row, change direction, and begin testing at the first chip. In FIG. 2, points 75, 76, 77, 78 illustrate the operating sequence when a hole occurs at the first point of the next row; points 80, 81, 82, 83 illustrate a somewhat more complex operation in which a chip occurs at the first point in the next row. Memory device 68 is connected to be set by an output on line 64 signifying a first hole 76 or 81 and to thereby energize its 1 output and de-energize its 0 output; the 0 output is connected to normally condition AND gate 38 as already described and setting device 68 prevents lowering the Z drive mechanism. The 1 output of device 68 energizes an input 85 of AND gate 71 and also energizes the down input 86 of Y drive mechanism 28 to make one step down to the next row.

When carriage 26 reaches the next row (point 77 or 82), Y drive mechanism 28 produces a signal on line 31 which is connected to set memory device 70; device 70 has its 1 output connected to input 46 of OR gate 41 to run X drive mechanism 27 continuously. When the first point in the next row is a hole, as 82, a signal appears on line 64 and conditions AND gate 71 to set memory device 69. The 1 output of device 69 is connected to energize line 50 to change the direction of X drive mechanism 27; it is also connected to an input 87 of AND gate 72. At the next chip, 83, an output on line 65 energizes the other input of AND gate 72; AND gate 72 then energizes the reset inputs of memory devices 68, 69, 70 to reset the circuit; this operation permits Z drive mechanism 34 to start the test routine in response to a signal on line 30 after X drive mechanism 27 completes its entry to the next position and it causes the X drive mechanism to then stop until it is next signaled on line 45.

When the first point in the new row is a chip, as 76, line 50 is not energized and X drive mechanism is continued running in the same direction; when a hole 77 is encountered, a signal on line 64 starts the sequence already described in the example in which hole 82 occurred at the first point in the next row.

In the summary, the 1 output of memory device 68 signals that the first hole has been encountered, line 31 signals that the row shift is complete, the 1 output of memory device 69 signals that the first hole has been encountered after a row shift, and the output of AND gate 72 signals that the first chip has been encountered after the change in direction in the next row.

So far the operation of the control circuit has been described for the simple case in which there are no internal holes 15 or isolated chips 16. Preferably, photograph 25 is touched up as already described for partial chips 14, so that the apparatus will operate in the mode just described by testing at holes 15, 17 (or by mechanically scanning but not actually operating the Z drive mechanism). The circuit of FIG. 1 can also be arranged to scan a preset number of such holes before starting a row change to provide this operating mode. For example, the beam 56 of light source 55 is shaped to illuminate two or more adjacent points in the same row and light sensitive device 57 is connected to energize line 58 when there is a chip at any one of the points and to energize line 59 when a hole occurs at each point; for the example of FIG. 1 in which the photograph is a negative, light from any transparent point in the light beam would actuate the photocell in the way described above in which a single point at a time is illuminated. The circuit can be modified to produce the same operation by connecting a counter in lines 64 to produce a pulse only after a preset number of adjacent holes.

*Other embodiments.*—The specific carriage drive and test connector drive of FIG. 1 are intended to illustrate the general features of a variety of such devices and present the problems of providing a suitable control. The specific logic circuit associated with light sensitive device 57 is also intended to illustrate the general operation that can be achieved by various logic circuit arrangements. Many of the functions of the motor controls described for drive mechanisms 27, 28, 34 can be performed by additional components in the logic circuit.

Although preferably photograph 18 is the same size as the corresponding wafer 10 and is mounted to be moved with the wafer, the photograph can be made larger or smaller so long as the relative motion in the XY plane of the test connector 33, the wafer, the light beam 56 and the photograph is arranged for scanning the photograph in step with the wafer.

As the apparatus has been described in detail, the photograph has been used to establish the pattern for mechanically scanning and for testing; two differing photographs and separate logic circuits can be provided for the two functions, for example, to mechanically scan but not test at internal holes 15, 17.

From the single embodiment of the invention described in detail and the suggested variations, those skilled in the art will recognize a variety of applications for the method and apparatus of this invention and appropriate modifications within the spirit of the invention and the scope of the claims.

What is claimed is:

1. A method of selectively positioning an object relative to a mechanism to operate on the object within an undefined outline of points on the object, these points being defined by a preceding operation of cutting the object into an array of chips, comprising:
    producing a photograph of the object having transparent and opaque regions differently signifying points of the object to be operated on and points to not be operated on;
    illuminating the photograph at a point corresponding to a point on the object in a position to be operated on;
    detecting whether a point on the object is to be operated on according to light transmitted through transparent points on the photograph;
    moving the point of illumination of the photograph as the operation on the object is moved relative to the operating mechanism from point to point, this movement being such that a point to point correspondence is maintained between the photograph and the object; and
    controlling the operating mechanism to sequentially operate on the points of the object according to the pattern of the photograph.

2. A method according to claim 1 in which the points on the object are discrete points arranged in rows and columns and the step of controlling the operating mechanism includes moving along a row of the object until reaching the first point not to be operated on and then operating in a next row.

3. A method according to claim 2 including the step of touching up the photograph where the distribution of photographically distinguishable points on the object differs from a desired region.

4. A method of controlling a mechanism to test semiconductor chips formed at points in rows and columns in an irregularly shaped wafer of semiconductor material, comprising:
    producing a photograph of the wafer having transparent and opaque regions according to the distribution of chips and holes in the wafer;
    illuminating a point on the photograph corresponding to a point on the wafer positioned for test;
    moving the point of illumination of the photograph as the test operation is moved from point to point on the wafer, this movement being such that a point to point correspondence is maintained between the photograph and the wafer;
    distinguishing between chips and holes in the wafer according to light transmitted through transparent points on the photograph; and
    controlling the test mechanism to follow the pattern of the photograph to test points corresponding to the chips of the semiconductor material.

5. A method according to claim 4 including touching up the photograph so that chips known before testing to be defective appear to be holes.

6. A method according to claim 4 including touching up the photograph so that isolated chips appear to be linked to other chips by chips located in the path of operation of the test mechanism.

7. A method according to claim 4 including touching up the photograph so that only a predetermined maximum number of holes appear consecutively along the path of operation within the outline of the wafer and in which the step of distinguishing includes distinguishing between chips and said predetermined number of consecutive holes.

8. A method according to claim 4 in which the step of controlling comprises:
    advancing from point to point along a row of the photograph while testing the corresponding chips on the wafer;
    sensing the end of a row by the presence of a predetermined number of consecutive holes; and then
    shifting the operation to the next row.

9. A method according to claim 8 in which the step of shifting the operation to the next row comprises:
    shifting to the next row;
    continuing from point to point on the photograph until a first predetermined number of consecutive holes are detected; and
    changing direction and beginning test at the first chip.

References Cited

UNITED STATES PATENTS

| | | |
|---|---|---|
| 2,047,013 | 7/1936 | Dorn. |
| 2,397,933 | 4/1946 | Fowle et al. |
| 3,185,927 | 5/1965 | Margulis et al. |

JEWELL H. PEDERSEN, *Primary Examiner.*

O. B. CHEW, *Assistant Examiner.*